United States Patent

Nicolas

(10) Patent No.: US 9,129,351 B2
(45) Date of Patent: Sep. 8, 2015

(54) FIDELITY MEASUREMENT OF DIGITAL IMAGES

(75) Inventor: Marina Nicolas, Voreppe (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 410 days.

(21) Appl. No.: 13/809,860

(22) PCT Filed: Jul. 13, 2011

(86) PCT No.: PCT/EP2011/061986
§ 371 (c)(1),
(2), (4) Date: Jun. 5, 2013

(87) PCT Pub. No.: WO2012/007519
PCT Pub. Date: Jan. 19, 2012

(65) Prior Publication Data
US 2013/0243333 A1    Sep. 19, 2013

(30) Foreign Application Priority Data
Jul. 16, 2010 (EP) ..................................... 10305789

(51) Int. Cl.
*G06K 9/46* (2006.01)
*G06T 7/00* (2006.01)

(52) U.S. Cl.
CPC ..... *G06T 7/0002* (2013.01); *G06T 2207/30168* (2013.01)

(58) Field of Classification Search
None
See application file for complete search history.

(56) References Cited

U.S. PATENT DOCUMENTS

2002/0199164 A1* 12/2002 Sengupta et al. ............... 716/11
2003/0026457 A1    2/2003 Nahum
2009/0148051 A1*  6/2009 Pham et al. .................... 382/219

FOREIGN PATENT DOCUMENTS

EP    1439491         7/2004
EP    1439491 A1 *   7/2004

* cited by examiner

*Primary Examiner* — Edward Park
*Assistant Examiner* — Fred Hu
(74) *Attorney, Agent, or Firm* — Slater & Matsil, L.L.P.

(57) ABSTRACT

There is provided a method of measuring the similarity of parts of digital image files (IF1, IF2,IF2-z)), which comprising the steps of calculating a first change value in a similarity between pixel values in a first segment (BIF1a) of a first digital image file (IF1) and in a second segment (BIF1b) of this first file (IF1), said first and second segments of said first file being spatially separated by a first translation vector (td1), calculating a second change value (v) in the similarity between pixel values in a first segment (BIF2a) of the second digital image file (IF2, IF2-z) and in a second segment (BIF2b) of the second file (IF2, IF2-z), said first and second segment of said second file being spatially separated a second translation vector (td2), wherein the first segment of the first file corresponds to substantially same part of the image as the first segment of the second file and wherein the second segment of the first file corresponds to substantially the same parts of the image as the second segment of the second file, and calculating a structure evolution value indicative of the similarity between the first and second changes.

17 Claims, 5 Drawing Sheets

FIDELITY MEASUREMENT OF DIGITAL IMAGES

TECHNICAL FIELD

The present invention relates to the fidelity measurement of digital images, in particular to the measurement of fidelity of an image before and after a transformation has been performed upon it.

BACKGROUND

In many situations, a way of measuring the similarity of one digital image to another is useful. This is particularly true when the second image is the result of a transformation performed on the first. Obtaining a numerical metric or figure of merit of the fidelity from a direct measurement of the two digital images at hand is desirable.

Digital images are often represented by files containing rectangular matrices of pixels. The number of pixels is often referred to as the resolution. The term may be used either as the resolution along a given axis or over the image file as a whole.

FIG. 1 represents some of the possible operations that it may be necessary to perform on a digital image file. A digital image file IF1 of M0 pixels wide and N0 pixels height may be operated on to produce a file IF2. IF2 may still be of format M0×N0. These operations can include compression, noise reduction, colour adjustment and many other possibilities.

Alternatively a zoom-like operation may be performed, producing a file IF2-zoom of resolution M1×N1. Also changes of image format are possible, such as from 4/3 to 16/9, in which case IF2-reformat will have a resolution M2×N0. The values of M2, M1 and N1 may be larger or smaller than M0 and N0.

The changes of resolution involve the addition or subtraction of pixels which requires interpolation calculations. There are various algorithms for performing these operations and the behaviour of these algorithms, in terms of errors and artifacts, varies and may depend on the actual content of the image.

It is therefore desirable to provide a technique of measuring the fidelity of one image file to another which can handle transformations which include changes in the number of pixels.

SUMMARY OF THE INVENTION

In one aspect, the present invention provides for a method of measuring the similarity of parts of first and second digital image files, comprising the steps of calculating a first change value in similarity between pixel values in a first segment of the first digital image file and in a second segment of the first digital image file, said first and second segments of said first digital image file being spatially separated by a first translation vector, calculating a second change value in similarity between pixel values of a first segment of the second digital image file and in a second segment of the second digital image file, said first and second segments of said second digital image file being spatially separated by a second translation vector; wherein the first segment of the first digital image file corresponds to substantially same part of the image as the first segment of the second digital image file and wherein the second segment of the first digital image file corresponds to substantially the same parts of the image as the second segment of the second digital image file, and calculating a structure evolution value indicative of the similarity between the first and second changes. In this way, the structural similarity of regions of different resolutions may be compared.

According to an embodiment, the second digital image file is produced by a process including a resolution changing operation applied to the first digital image file.

According to an embodiment, there is also provided a method wherein the first and second translation vectors are orthogonal to the borders of the respective first and second digital image files.

According to an embodiment, there is also provided a method wherein at least one of the first and second translation vectors is non-orthogonal to the borders of the respective first and second digital image file.

According to an embodiment, there is also provided a method wherein the first and second translation vectors have the same magnitude.

According to an embodiment, there is also provided that the method further comprising the step of calculating a calibration factor using the equation calibration factor=$(F \cdot \text{zoom} - G) \cdot \text{zoom} + 1 - F + G$ where F is a number between −0.5 and +3 and G is a number between −3 and +7 and zoom is a number representing the change in resolution between first and second image files.

According to an embodiment, the second translation vector has a magnitude proportional to the magnitude of the first translation vector multiplied by the change in resolution along its direction.

According to an embodiment, the translation vectors have a magnitude substantially the same as the repeat distance of a periodic pattern present in the digital image file.

According to an embodiment, the change value is estimated using a co-variance of the pixel values.

According to an embodiment, the structure evolution value is calculated as a product of a structure evolution value measured using translation vectors in one direction and a structure evolution value measured using translation vectors in another direction.

According to an embodiment, the method further comprises the step of calculating a difference of average value from the average of the pixel values in the first segment of the first digital image file and the first segment of the second digital image file.

According to an embodiment, the method further comprises the step of calculating a contrast difference value from the standard deviations of the pixel values in the first segment of the first digital image file and the first segment of the second digital image file.

According to an embodiment, the method further comprises the step of calculating a fidelity metric from a weighted product of said difference of average value, said contrast difference value and said structure evolution value.

According to an embodiment, at least one of the first and second digital image files has been derived from another digital image file by the application of a mask function According to an embodiment, the pixel value is obtained from at least one of the values of the component values of the pixel.

According to an embodiment, the pixel value represents the luminance.

Furthermore there is provided, according to an embodiment, an electronic device adapted to execute the method of any of the preceding claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention.

In the interests of clarity, the same references numerals are used to designate the same elements throughout the drawings, unless indicated otherwise. Also, features which have been described once will not be described in further detail. The use of subscript 1 and 2 denote data pertaining to image files IF1 and IF2 respectively. The subscript '1/2' indicates the formula being applied to one or other file, or possibly both.

Figure 1:
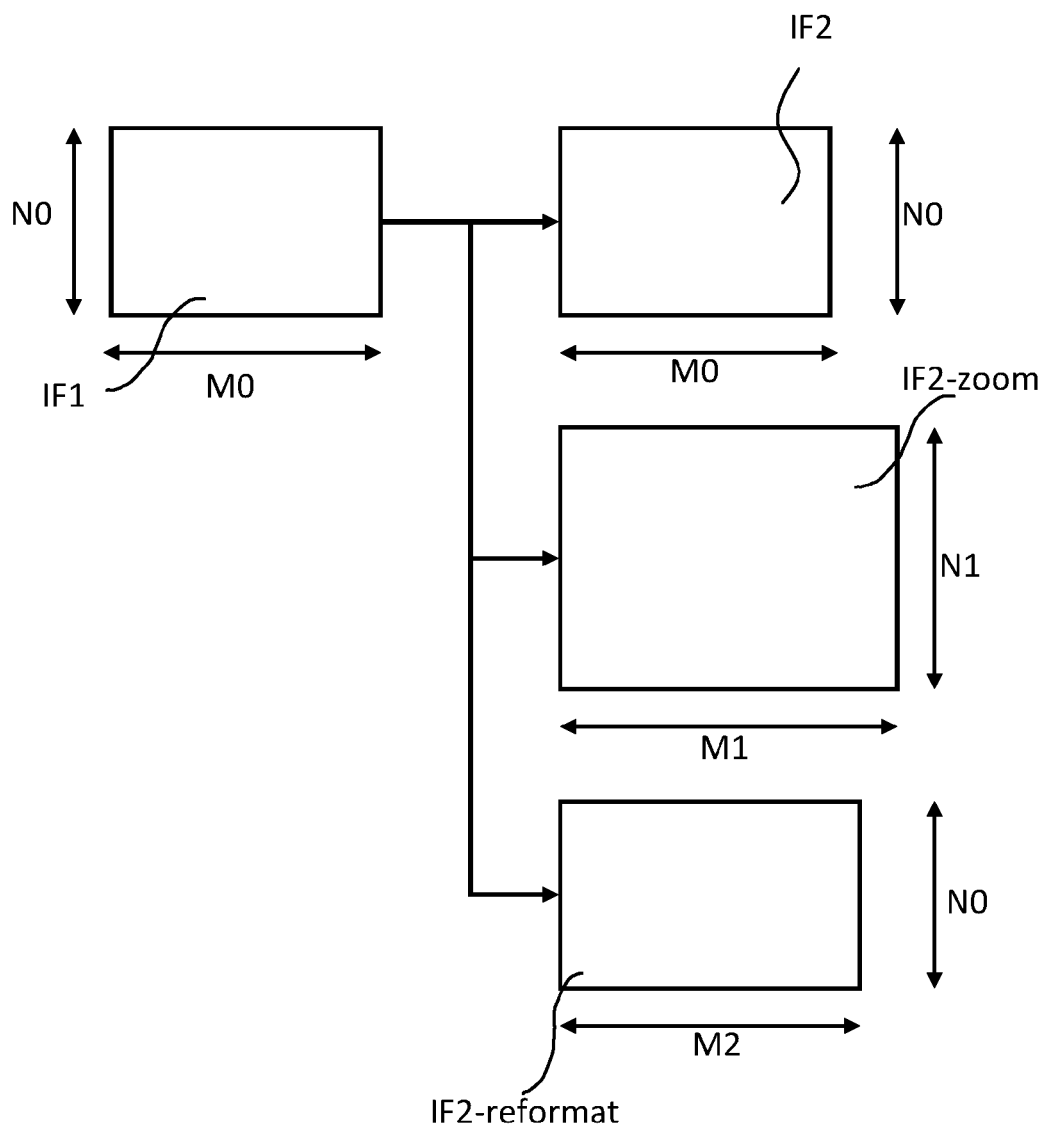
FIG. 1 represents some of the operations which may be performed on a digital image file.
Figure 2:
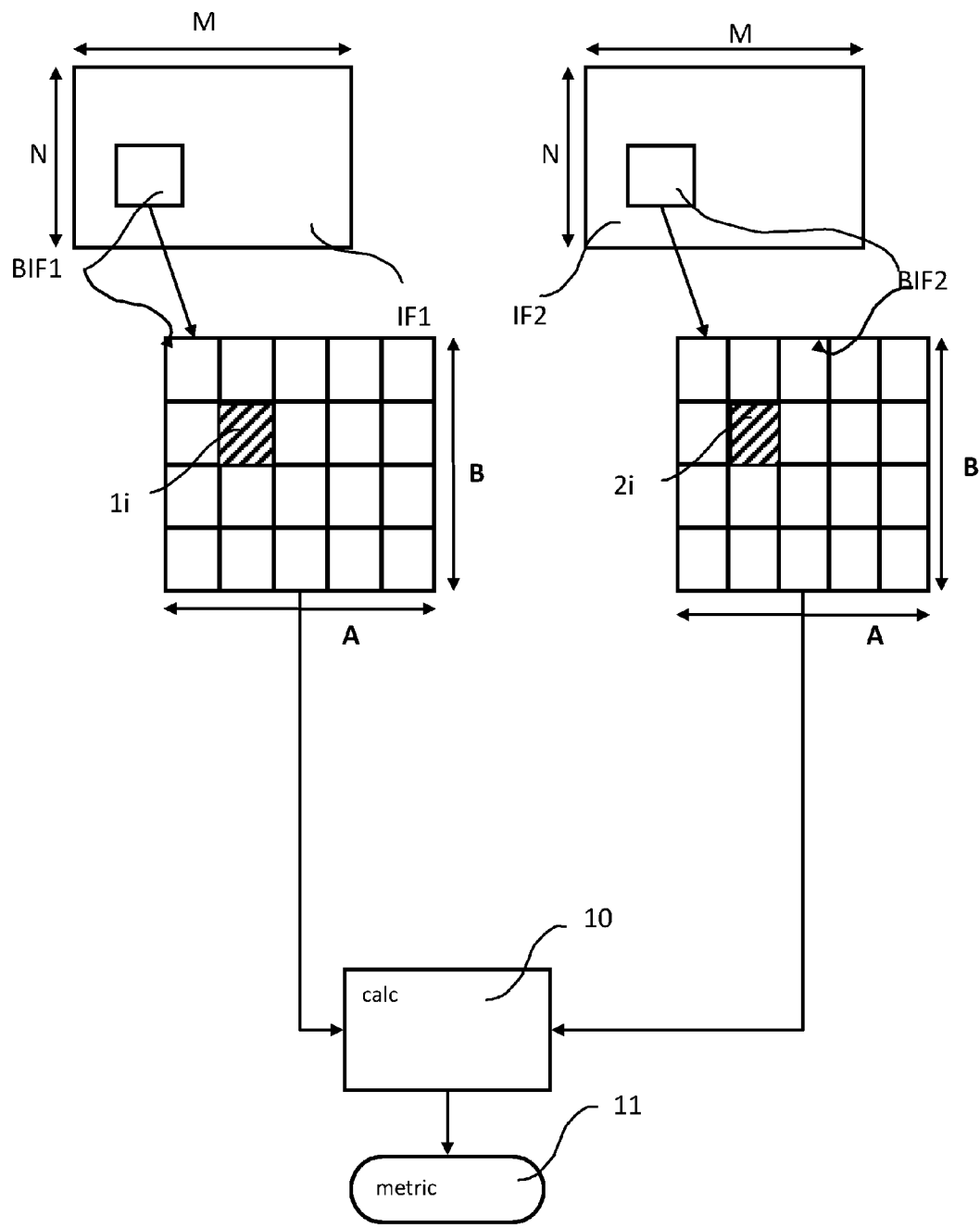
FIG. 2 represents a method for measuring, by direct comparison, the fidelity of two image files.

FIG. 2 represents a method, known as SSIM, of comparing directly an image file IF1 to another image file IF2, both files being of size M×N pixels.

Blocks of pixels, BIF1 and BIF2 are selected from image file IF1 and image file IF2 respectively. The two blocks, BIF1 and BIF2 are selected to correspond to substantially the same parts of the actual image. In order that the blocks correspond, the image files have been aligned. Various methods for this alignment step are known to those skilled in the art, who will know how to choose the most appropriate one. BIF1 and BIF2 are both of size A×B pixels.

The luminance values for individual pixels are fed into a calculation engine 10 (calc). The output of the calculation engine, which acts to compare the two blocks, BIF1, BIF2, constitutes a fidelity metric 11 (metric) for the block of pixels in question. The fidelity metric may be stored and the operation is repeated as often as desired.

Colour images may be represented using different components, a value for each of which is stored in each pixel. A given set of colour components is often referred to as a colour space. How the luminance information is stored depends on which colour space is used. Where YCbCr or a similar scheme is used, the luminance, or more correctly 'luma,' is directly available in the Y component and this is suitable for applying the method described herewith. Otherwise, one skilled in the art will be able to select an appropriate method of converting the colour space of the image files IF1, IF2 to YCbCr or some other appropriate scheme.

Figure 3:
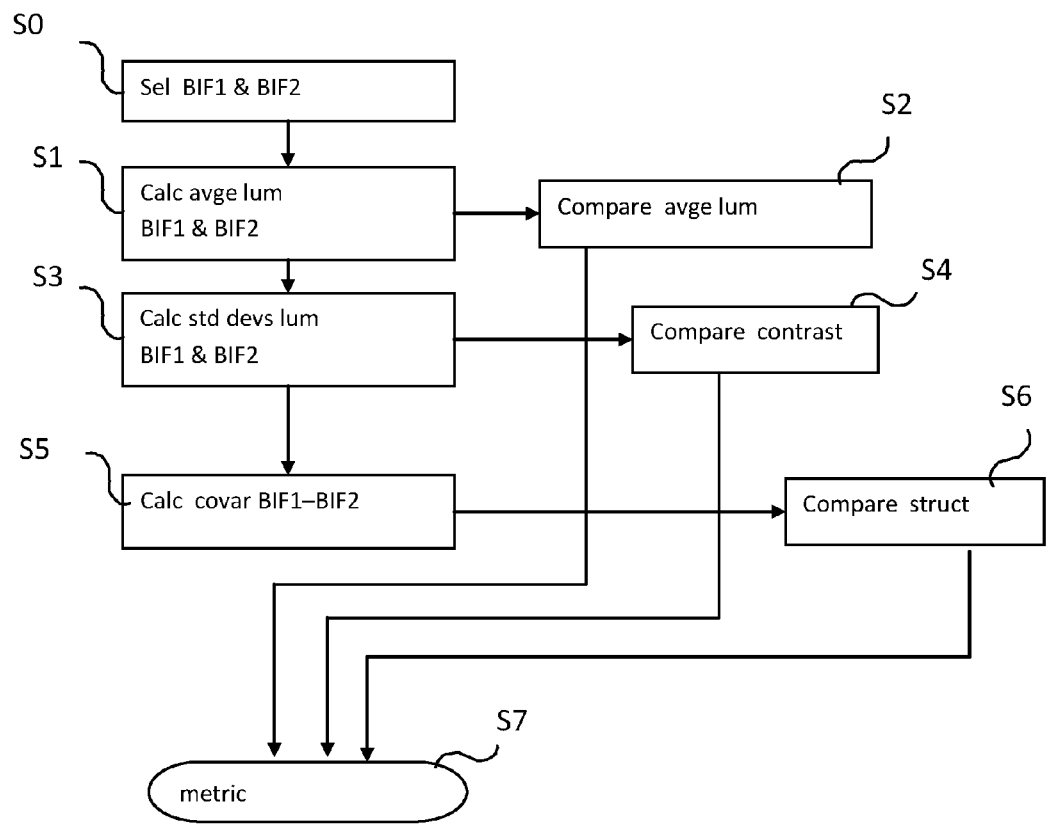
FIG. 3 represents a flow of operations for performing the method of FIG. 2.

FIG. 3 represents a flow for the steps performed by the calculation engine. At step S0 (Sel BIF1 & BIF2), aligned blocks BIF1 and BIF2 are selected.

At step S1 (Calc avge lum BIF1 & BIF2), the respective averages for luminance across all the pixels in blocks BIF1, BIF2, respectively, are calculated according to $$\overline{Y}_x = \frac{1}{A \cdot B} \sum_{i=1}^{A \cdot B} Y_{xi} \qquad [1]$$

where $Y_{xi}$ is the luminance values of pixel i (see FIG. 2) in the block in question, and subscript 'x' takes the value of 1 or 2 according to which of blocks BIF1 or BIF2 is concerned.

At step S2 (Compare avge lum), a value for the comparison of measurement of the average luminances, l(BIF1, BIF2) is obtained using the equation $$l(BIF1, BIF2) = \frac{2\overline{Y}_1\overline{Y}_2 + C_l}{\overline{Y}_1^2 + \overline{Y}_2^2 + C_l} \qquad [2]$$

The constant $C_l$ is introduced to avoid instability when the term $\overline{Y}_1^2 + \overline{Y}_2^2$ is very close to zero. A possible value for this may be calculated using $$C_l = (k_1 L)^2 \qquad [3]$$

Where the constant k<<1 and L is dynamic range for the luminance.

At step S3 (Calc std devs lum BIF1 & BIF2) the respective standard deviations of the luminance within the two blocks, BIF1, BIF2 are calculated, according to $$\sigma_x = \left( \frac{1}{A \cdot B} \sum_{i=1}^{A \cdot B} (Y_{xi} - \overline{Y}_x)^2 \right)^{\frac{1}{2}} \qquad [4]$$

Where, as before, subscript 'x' takes the value of 1 or 2 according to which of blocks BIF1 or BIF2 is concerned.

At step S4 (Comp contrast), the respective values are normalized by dividing them by the sum of the variances in order to calculate a value for the comparison of the degrees of contrast using the following equation $$c(BIF1, BIF2) = \frac{2 \cdot \sigma_1 \cdot \sigma_2 + C_c}{\sigma_1^2 + \sigma_2^2 + C_c} \qquad [5]$$

where $C_c$ is again a constant introduced to avoid instability when the term $\sigma_1^2 + \sigma_2^2$ is very close to zero. The constant $C_c$ may be calculated as $$C_c = (k_2 L)^2 \qquad [3]$$

where $k_2 \ll 1$.

At step S5 (Calc covar BIF1–BIF2) the correlation in the luminance values (change values) between the two blocks, BIF1, BIF2, is calculated. This is done by calculating the covariance of the values of the two blocks. This may be done according to the equation $$v_{12} = \frac{1}{A \cdot B} \sum_{i=1}^{A \cdot B} [(Y_{1i}) - \overline{Y_1}] \cdot (Y_{2i} - \overline{Y_2}) \qquad [7]$$

where $Y_{1i}$ denotes the value of pixel i in block BIF1 (see FIG. 2) and $Y_{2i}$ that of pixel i in BIF2.

At step S6 (Comp struct), the structural similarity (structure evolution value) of the two blocks, BIF1, BIF2, is estimated from the covariance $v_{12}$ and the two standard deviations, $\sigma_1$ and $\sigma_2$ according to the equation $$s(BIF1, BIF2) = \frac{v_{12} + C_s}{\sigma_1 \sigma_2 + C_s} \qquad [8]$$

As before the constant $C_s$ is present to avoid instability when the other denominator term approaches zero and may be determined using $$C_s = (k_3 L)^2 \qquad [9]$$

where the constant $k_3 \ll 1$.

The 3 comparison values may then be combined into a single fidelity metric according to $$M(BIF1,BIF2) = l(BIF1,BIF2)^\alpha \cdot c(BIF1,BIF2)^\beta \cdot s(BIF1, BIF2)^\gamma \qquad [10]$$

where $\alpha$, $\beta$ and $\gamma$ are non-zero parameters for adjusting the weightings of the terms.

This method produces a fidelity metric from a direct comparison of two image files. However, it relies on the blocks BIF1 and BIF2 being of the same size, particularly for the calculation of the covariance since this involves summing a product of two variances over a same interval. This in turn assumes that the images have substantially the same resolution in both horizontal and vertical directions. Otherwise the two blocks, BIF1 and BIF2, will contain significantly different portions of the actual image and so the correlation will be impaired.

Figure 4:
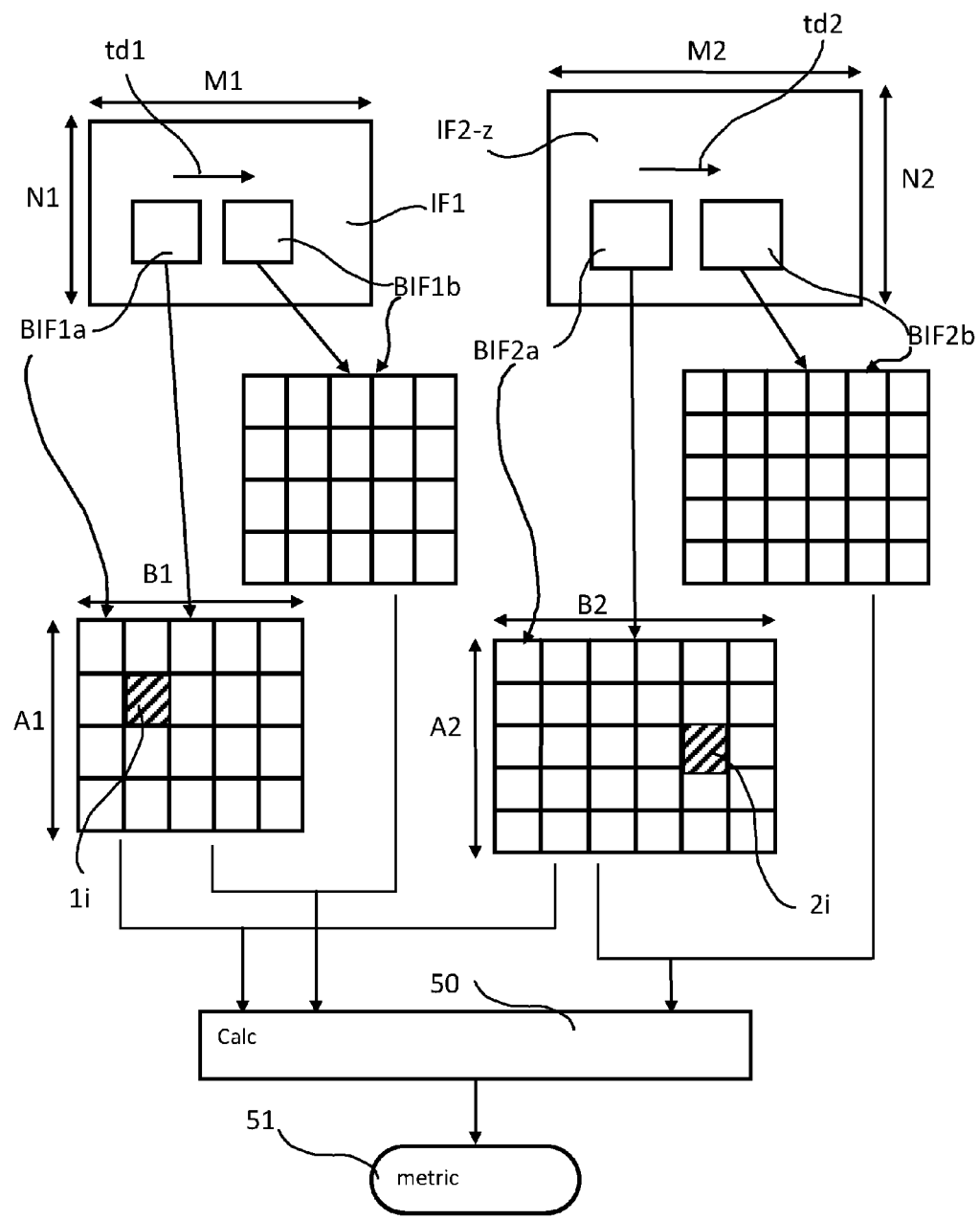
FIG. 4 represents a method for measuring, by direct comparison, the fidelity of two image files, possible of different resolutions, having different numbers of pixels.

FIG. 4 represents a method of directly comparing an image file IF1 to another image file IF2-z having differing resolutions of M1×N1 pixels and M2×N2 pixels, respectively.

As with the method in FIG. 2, blocks BIF1a and BIF2a are chosen from image file IF1 and IF2-z respectively. These blocks are aligned i.e. they are centred on substantially the same part of the image. BIF1a is of size A1×B1 pixels and BIF2a which is of size A2×B2 where $$A2 = \frac{M2}{M1} \cdot A1 \qquad [11]$$

and $$B2 = \frac{N2}{N1} \cdot B1 \qquad [12]$$

It is possible that these ratios could yield non-integer block sizes, which would mean having to handle sub-pixel elements and the resultant accuracy issues. Though specific filtering could be envisaged, simply rounding can give acceptable results. One possible version of rounding is given by applying a floor function $$A2 = \text{floor}\left(\frac{M2}{M1} \cdot A1 + 0.5\right) \qquad [13]$$

and $$B2 = \text{floor}\left(\frac{N2}{N1} \cdot B1 + 0.5\right) \qquad [14]$$

Further blocks, BIF1b and BIF2b are derived, translated by vectors td1 and td2 respectively, from blocks BIF2a and BIF2b. Block BIF1b is the same size as block BIF1a and block BIF2b is the same size as block BIF2a. The vectors td1 and td2 may be parallel to either one or the other of the borders of the pixel arrays composing image files IF1 and IF2. They may be said to be horizontal when parallel to the horizontal axis of the actual image and vertical when parallel to the vertical axis. Typically, the vectors td1 and td2 would both be in the same direction relative to the actual image, though there may be situations where this is not the case.

A calculation engine 50 (calc) compares the average luminance data from block BIF1a to that of block BIF2a. It further compares the contrast data from block BIF1a to that of BIF1b. Finally it compares structural characteristics in the data of blocks BIF1a to that of BIF1b and the data from BIF2a to BIF2b. The results of these fidelity measurements are combined to produce a fidelity metric 51 (metric).

Figure 5:
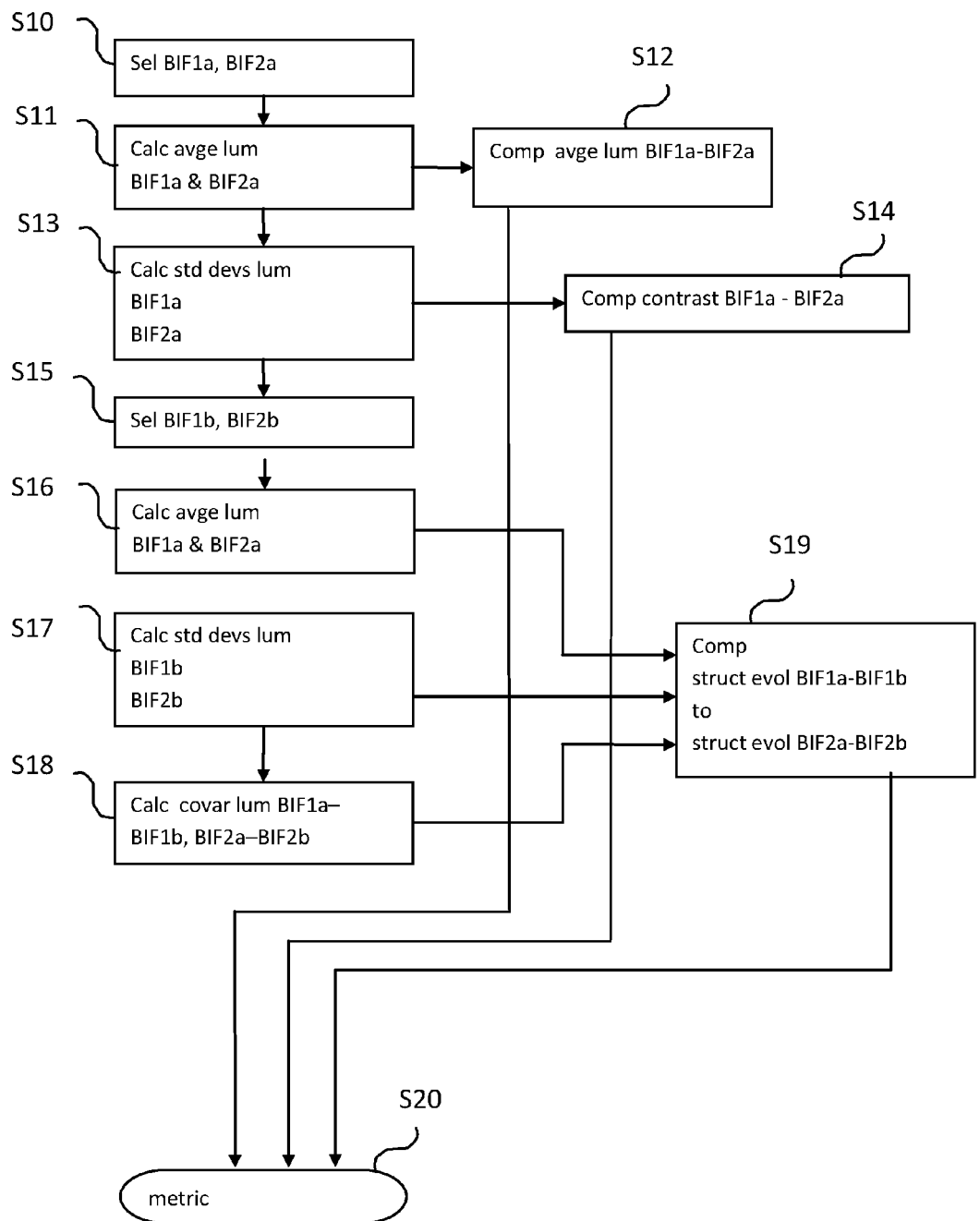
FIG. 5 represents a flow of operations for performing the method of FIG. 4.

FIG. 5 represents a flow for the steps performed by the calculation engine 50. At step S10 (Sel BIF1a & BIF2a), a first pair of aligned blocks BIF1a and BIF2a are chosen from image file IF1 and IF2-z respectively. Henceforth an 'a' in the subscript indicates parameters pertaining to blocks BIF1a and BIF2a.

At step S11 (Cal avge lum BIF1a & BIF2a), the arithmetic means of the respective luminances of the pixels, according to the equations $$\overline{Y}_{1a} = \frac{1}{A1 \cdot B1} \sum_{i=1}^{A1 \cdot B1} Y_{1ai} \qquad [15]$$

and $$\overline{Y}_{2a} = \frac{1}{A2 \cdot B2} \sum_{i=1}^{A2 \cdot B2} Y_{2ai} \qquad [16]$$

where $Y_{1ai}$ is the luminance value of pixel $1i$ (see FIG. 4) in the block BIF1a and $Y_{2ai}$ is that of pixel $2i$ in BIF2a.

At step S12 (Compare avge lum BIF1a–BIF2a), the average luminance of block BIF1a is compared to that of BIF2a according to the equation $$l(BIF1a, BIF2a) = \frac{2\overline{Y}_{1a}\overline{Y}_{2a} + C_l}{\overline{Y}_{1a}^2 + \overline{Y}_{2a}^2 + C_l} \qquad [17]$$

The constant $C_l$ has the same role as previously described and may be calculated by equation 3.

At step S13 (Calc std dev lum BIF1a BIF2a), the respective standard deviations of the luminance within the two blocks, BIF1a and BIF2a, are calculated, according to $$\sigma_{1a} = \left(\frac{1}{A1 \cdot B1} \sum_{i=1}^{A1 \cdot B1} (Y_{1ai} - \overline{Y}_{1a})^2\right)^{\frac{1}{2}} \qquad [18]$$

and $$\sigma_{2a} = \left(\frac{1}{A2 \cdot B2} \sum_{i=1}^{A2 \cdot B2} (Y_{2ai} - \overline{Y}_{2a})^2\right)^{\frac{1}{2}} \qquad [19]$$

At step S14 (Comp contrast BIF1a–BIF2a), the respective values are normalized by division by the sum of the variances in to calculate a comparison value for the degrees of contrast using the following equation $$c(BIF1a, BIF2a) = \frac{2 \cdot \sigma_{1a} \cdot \sigma_{2a} + C_\varepsilon}{\sigma_{1a}^2 + \sigma_{2a}^2 + C_\varepsilon} \quad [20]$$

where $C_c$ is as per equation 6.

At step S15, the two further blocks BIF1$b$ and BIF2$b$ are selected, These blocks are centred on positions shifted by the vectors td1 and td2. Henceforth a 'b' in the subscript refers to values pertaining to block BIF1$b$ or BIF2$b$.

At step S16 (Calc std dev lum BIF1$b$, BIF2$b$), the average luminance values are calculated by the following equations:

$$\overline{Y_{1b}} = \frac{1}{A1 \cdot B1} \sum_{i=1}^{A1 \cdot B1} Y_{1bi} \quad [21]$$

and $$\overline{Y_{2b}} = \frac{1}{A2 \cdot B2} \sum_{i=1}^{A2 \cdot B2} Y_{2bi} \quad [22]$$

where $Y_{1bi}$ denotes the luminance value of pixel $1i$ in block BIF 1$b$ and $Y_{2bi}$ that of pixel $2i$ in BIF2$b$.

At step S17 (Calc std dev lum BIF 1$b$, BIF2$b$), the standard deviations of the luminance values are calculated as per the equations $$\sigma_{1b} = \left( \frac{1}{(A1 \cdot B1)} \sum_{i=1}^{A1 \cdot B1} (Y_{1bi} - \overline{Y_{1b}})^2 \right)^{\frac{1}{2}} \quad [23]$$

and $$\sigma_{2b} = \left( \frac{1}{(A2 \cdot B2)} \sum_{i=1}^{A2 \cdot B2} (Y_{2bi} - \overline{Y_{2b}})^2 \right)^{\frac{1}{2}} \quad [24]$$

At step S18 (Calc covar lum BIF1$a$–BIF1$b$, BIF2$a$–BIF2$b$), the correlation in luminance distributions between the blocks BIF1$a$ and BIF1$b$, is calculated. This is done by calculating the covariance of the values of the two blocks according to the equation $$v_{1ab} = \frac{1}{A1 \cdot B1} \sum_{i=1}^{A1 \cdot B1} [(Y_{1ai}] - \overline{Y_{1a}}) \cdot (Y_{1bi} - \overline{Y_{1b}}) \quad [25]$$

and the correlation in luminance distributions between the blocks BIF2$a$ and BIF2$b$, is calculated. This is done by calculating the covariance of the values of the two blocks according to the equation $$v_{2ab} = \frac{1}{A2 \cdot B2} \sum_{i=1}^{A2 \cdot B2} [(Y_{2ai}] - \overline{Y_{2a}}) \cdot (Y_{2bi} - \overline{Y_{2b}}) \quad [26]$$

At step S19 (Comp struct evol BIF1$a$–BiF2$a$ to struct evol BIF2$a$–BIF2$b$), the change in structure between the two blocks, BIF1$a$, BIF1$b$, is estimated. This may be performed using the covariance $v_{1ab}$ and the two standard deviations, $\sigma_{1a}$ and $\sigma_{1b}$ according to the equation $$s(BIF1a, BIF1b) = \frac{2 \cdot v_{1ab} + C_s}{\sigma_{1a}\sigma_{1b} + C_s} \quad [27]$$

and the change in structure between the two blocks, BIF2$a$, BIF2$b$, is estimated from the covariance $v_{2ab}$ and the two standard deviations, $\sigma_{2a}$ and $\sigma_{2b}$ according to the equation $$s(BIF2a, BIF2b) = \frac{2 \cdot v_{2ab} + C_s}{\sigma_{2a}\sigma_{2b} + C_s} \quad [28]$$

As before the constant $C_s$ is described in equation 9.

Because the calculation of the structure term is performed on blocks of the same size and the fidelity measurement between the image files is based on the evolution of the structure parameter s(BIF1$a/b$,BIF2$a/b$), a fidelity measurement between image files of differing resolutions may be made.

In the case of a zoom in both directions, it may be useful to perform the measurement method along both axes. This gives a vertical structure evolution vs(BIF1$a/b$,BIF2$a/b$) and a horizontal structure evolution hs(BIF1$a/b$,BIF2$a/b$).

It is possible to use vectors td1 and td2 having the same magnitude, despite the fact that the files IF1 and IF2-$z$ have different resolutions. This is possible because large amplitude changes in structure are often spread out over several pixels. Therefore it is possible to make a small shift of position in both image files IF1 and IF2-$z$ and have the respective pairs of blocks BIF1$a$-BIF2$a$ and BIF1$b$-BIF2$b$ correspond to similar parts of the same feature in the image. It is preferable that the magnitude of the translation vectors td1 and td2 is small relative to the distance over which the features in the image change.

In this case a calibration may be applied to the results from IF2-$z$ to facilitate the fidelity measurement. Therefore calibrated structure evolution value becomes, for the vertical translations $$vs_{cal(BIF2a,BIF2b)} = 1 - ver_{weight} \cdot (1 - s(BIF2a,BIF2b)) \quad [29]$$

where ver_weight is given by $$ver_{weight} = (F \cdot hor_{zoom} - G) \cdot hor_{zoom} + 1 - F + G \quad [30]$$

where hor_zoom is the zoom factor in the horizontal direction, and the calibrated structure evolution for horizontal translations becomes $$hs_{cal(BIF2a,BIF2b)} = 1 - hor_{weight} \cdot (1 - s(BIF2a,BIF2b)) \quad [31]$$

where hor_weight is given by $$hor_{weight} = (F \cdot ver_{zoom} - G), ver_{zoom} + 1 - F + G \quad [32]$$

The reason that each zoom factor is used to determine the calibration factor for the direction perpendicular to it is because the zoom in any one direction has its biggest effect, in terms of artifacts, on the perpendicular direction.

The terms F and G are constants. Typical values for F and G which will give satisfactory results in many situations are 0.8306 and 0.1107 respectively. However it is possible to use values of F between −0.5 and +3 and values of G between −3 and +7. It may be found that the actual values giving the best result depend on the image content and the zoom algorithm used.

It is also possible to adjust the magnitude of td2 relative to that of td1. For example it may be set to td1×change in resolution (or zoom factor) in the relevant direction. In this case a calibration is probably not necessary.

The values for the comparison of the vertical and horizontal structure evolutions between image files IF1 and IF2, vs(BIF2,BIF2) and vs(BIF2,BIF2), may be calculated by $$hs(BIF1, BIF2) = \frac{2 \cdot hs(BIF1a, BIF1b) \cdot hs_{cal(BIF2a \cdot BIF2b)} + C_s}{hs(BIF1a, BIF1b)^2 + hs_{cal(BIF2a \cdot BIF2b)}^2 + C_s} \quad [33]$$

and $$vs(BIF1, BIF2) = \frac{2 \cdot vs(BIF1a, BIF1b) \cdot vs_{cal(BIF2a \cdot BIF2b)} + C_s}{vs(BIF1a, BIF1b)^2 + vs_{cal(BIF2a \cdot BIF2b)}^2 + C_s} \quad [33]$$

In the case where calibration is not used, the terms $hs_{cal(BIF2a,BIF2b)}$ and $vs_{cal(BIF2a,BIF2b)}$ and equations 33 and 34 will be replaced by the terms hs(BIF2a,BIF2b), and vs(BIF2a,BIF2b) respectively. The constant is as described previously.

The subscripts 'a' and 'b' have been removed from vs(BIF2,BIF2) and vs(BIF2,BIF2) to reflect the fact that the two structure evolutions have been combined into a single result.

The horizontal and vertical structure evolutions may be combined into an overall structure evolution by $$s(BIF1,BIF2)=hs(BIF2,BIF2)\cdot vs(BIF1,BIF2) \quad [35]$$

Finally the 3 components of the measurement may be combined to produce a fidelity metric M(BIF1,BIF2) as follows $$M(BIF1,BIF2)=l(BIF1,BIF2)^{\alpha} \cdot (BIF1,BIF2)^{\beta} \cdot s(BIF1, BIF2)^{\gamma} \quad [36]$$

where $\alpha$, $\beta$ and $\gamma$ are parameters for adjusting the weightings of the terms. It may be possible to achieve acceptable results by setting either or both $\alpha$ and $\beta$ to zero, thereby using only structure comparison s(BIF1,BIF2) for establishing the fidelity metric.

Where an image has a strong periodic pattern, certain zoom algorithms may introduce errors actually affecting the periodicity of the pattern. It is desirable to make the fidelity measurement particularly sensitive to this effect. As previously mentioned, the magnitude of td1 may often be 1 pixel. However, setting the magnitude to values close to the repeat distance of the periodic pattern can have the benefit of making the fidelity measurement more sensitive to errors in the periodicity. Also it may serve to reduce the amount of calculations.

It should be understood that other forms of the equations in the preceding discussion are possible. Indeed, other definitions for the variation within populations are possible and so the standard deviation formula and that given for the covariance may be replaced by other variation. Also other forms of equations 33 and 34 are possible, and may save calculation effort. The person skilled in the art will be able to make such adaptations.

In the preceding discussion, the fidelity measurement between image file IF1 and IF2-z has been made using the luminance values of the pixels. It may be useful to establish a fidelity metric for individual colour components and select between the results, for example taking the worst case. Another possibility is to apply the method to values obtained by combining the colour components.

There are situations where the zoom transformation introduces artifacts which are more strongly linked to the actual content of the image. Such areas, which are often referred to as 'regions of interest' (ROI), require more attention in these situations. By applying mathematical operations to each pixel, the ROI can be 'selected' for special treatment over other regions. Such an operation is often termed a mask.

For example, areas of a person's skin can be an ROI. Where an image containing a large amount of a person's skin, the algorithms used to create the interpolated pixels added to the zoomed image sometimes produce incorrect colours. This is often around the border of the skin area such as the edge of the face.

It is possible to estimate how close a given pixel is to an ideal skin tone and create a mask selecting such areas. A simple version of the mask could be calculating the difference in the values of the colour components between the actual pixel and ideal values. More complicated versions are also possible such as those including the overall luminance as well as the colour information. This calculation can be applied, as a mask, pixel by pixel, to the whole image to produce a derived image.

In the case of cartoon images, the errors are concentrated on the strong contours since the large uniform blocks of colour are handled acceptably by the zoom transformation algorithms. Therefore, in a similar manner to the skin tone case, a mask which selects the contours may be applied to produce derived images files IF1 'and IF2-z', The fidelity measurement method of FIGS. 4 and 5 may be applied but with a reduced calculation effort.

Examples of other ROI's that occur are areas of grass and areas of sky and expanses of sand. One that poses particular problems to zoom algorithms is running water.

In the present case, the same mask may be applied to image file IF1 and IF2-z to produce derived image files IF1' and IF2-z'. The fidelity measurement method described above in reference to FIGS. 4 and 5 may then be applied to derived image files IF1' and IF2-z' thus producing a fidelity measurement particularly sensitive to the distortion effects of the zoom transformation on the skin tones.

Other variations on the method described above may be possible. For example, the vectors td1 and td2 may be in other orientations than orthogonal to the pixel array borders.

It may be useful to adjust the magnitude of the vectors according to different zones of the image, For instance, a larger magnitude could be applied for uniform areas of the image in order to reduce calculation time.

The method described above may be operated on a computer correctly programmed. It is advisable that it have sufficient resources, such as memory, for the calculations and the ability to use high precision representations for the numerical values. It could also be possible to make a custom built device, such as a device containing an integrated circuit, for the purpose. Here, it would be possible to adapt it to the needs of memory and high precision numbers.

Having thus described at least one illustrative embodiment of the invention, various alterations, modifications and improvements will readily occur to those skilled in the art. Such alterations, modifications and improvements are intended to be within the spirit and scope of the invention. Accordingly, the foregoing description is by way of example only and is not intended to be limiting. The invention is limited only as defined in the following claims and the equivalent thereto.

The invention claimed is:

1. A method of measuring the similarity of parts of first and second digital image files (IF1, IF2, IF2-z), comprising the steps of
   calculating a first change value (v) in a similarity between pixel values in a first segment (BIF1a) of the first digital image file (IF1) and in a second segment (BIF1b) of the first digital image file (IF1), said first and second segments of said first digital image file being spatially separated by a first translation vector (td1);

calculating a second change value (v) in the similarity between pixel values of a first segment (BIF2a) of the second digital image file (IF2, IF2-z) and in a second segment (BIF2b) of the second digital image file (IF2, IF2-z), said first and second segments of said second digital image file being spatially separated by a second translation vector (td2);

wherein the first segment of the first digital image file corresponds to substantially a same part of the image as the first segment of the second digital image file and wherein the second segment of the first digital image file corresponds to substantially a same part of the image as the second segment of the second digital image file, and calculating a structure evolution value (s) indicative of the similarity between the first and second change values.

2. The method of claim 1 wherein the second digital image file (IF2-z) is produced by a process including a resolution changing operation applied to the first digital image file (IF1).

3. The method of claim 1 wherein the first and second translation vectors (td1, td2) are orthogonal to the borders of the respective first and second digital image files.

4. The method of claim 1 wherein at least one of the first and second translation vectors (td1, td2) is non-orthogonal to the borders of the respective first and second digital image file.

5. The method of claim 4 wherein the first and second translation vectors have the same magnitude.

6. The method of claim 5 further comprising the step of calculating a calibration factor using the equation calibration factor=(F·zoom−G)·zoom+1−F+G where F is a number between −0.5 and +3 and G is a number between −3 and +7 and zoom is a number representing a change in resolution between first and second image files.

7. The method of claim 1 wherein the second translation vector has a magnitude proportional to the magnitude of the first translation vector multiplied by a change in resolution along its direction.

8. The method of claim 1 wherein the translation vectors have a magnitude substantially the same as the repeat distance of a periodic pattern present in the digital image file.

9. The method of claim 1 wherein the respective change values are estimated using a co-variance of the pixel values.

10. The method of claim 1 wherein the structure evolution value is calculated as a product of a structure evolution value measured using translation vectors in one direction and a structure evolution value measured using translation vectors in another direction.

11. The method of claim 1 further comprising the step of calculating a difference of average value from the average of the pixel values in the first segment of the first digital image file and the first segment of the second digital image file.

12. The method of claim 1 further comprising the step of calculating a contrast difference value from the standard deviations of the pixel values in the first segment of the first digital image file and the first segment of the second digital image file.

13. The method of claim 12, further comprising the step of calculating a fidelity metric from a weighted product (m) of said difference of average value (l), said contrast difference value (c) and said structure evolution value (s).

14. The method of claim 1 wherein at least one of the first and second digital image files has been derived from another digital image file by the application of a mask function.

15. The method claim 1 wherein the pixel value is obtained from at least one of the values of the component values of the pixel.

16. The method of claim 1 wherein the pixel value represents luminance.

17. An electronic device adapted to execute the method of any of the preceding claims.

* * * * *